Oct. 29, 1968

H. WEISS 3,408,499

RADIATION SENSOR UTILIZING SEMICONDUCTOR BODY HAVING
PHOTO-ELECTROMAGNETIC EFFECT

Filed Aug. 18, 1964

United States Patent Office 3,408,499
Patented Oct. 29, 1968

3,408,499
RADIATION SENSOR UTILIZING SEMICONDUCTOR BODY HAVING PHOTO-ELECTROMAGNETIC EFFECT
Herbert Weiss, Nuremburg, Germany, assignor to Siemens Aktiengesellschaft, Munich, Germany
Filed Aug. 18, 1964, Ser. No. 390,344
Claims priority, application Germany, Dec. 18, 1963, S 88,772
8 Claims. (Cl. 250—211)

ABSTRACT OF THE DISCLOSURE

A semiconductor crystalline body having a photo-electromagnetic effect is mounted in a magnetic field and has mutually spaced electrodes for providing radiation-responsive voltage between such electrodes. The semiconductor body has between the electrodes a radiation incidence face accessible to radiation to be sensed. The semiconductor body has a multitude of geometrically anisotropic inclusions in the shape of elongated needles which are dispersed and embedded in the semiconductor body and are of higher conductivity than the semiconductor substance of the semiconductor body. The inclusions are oriented transversely to the spacing direction of the electrodes and to the direction of current flow produced by the photo-electromagnetic effect in the semiconductor body. The inclusions are parallel to the direction of incidence of radiation at the radiation incidence face.

---

Figure 1:
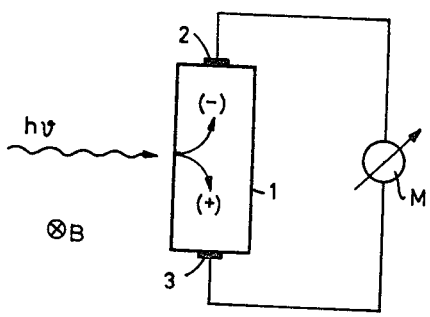

My invention relates to devices for sensing electromagnetic radiation, particularly in the infrared and the adjacent visible portion of the spectrum.

It has been attempted to produce radiation detectors from homogeneous light-sensitive material, utilizing the photo-electromagnetic effect. Heretofore, however, such devices, although exhibiting a very rapid response, were far from sufficient sensitivity for technological application.

It is an object of my invention to provide a radiation detector of much higher sensitivity on the basis of the photo-electromagnetic effect (PEM-effect).

I have discovered, according to the present invention, that a considerable increase in sensitivity is achieved if the radiation-responsive body exposed to the magnetic field of such a device consists of semiconductor crystalline material made inhomogeneous by spacially alternating regions of electrically better and poorer conductivity, the electrically good conducting regions extending parallel to the direction of the incident radiation and/or perpendicularly to the flow direction of the electric current generated in the semiconductor by the PEM-effect. The term "good conducting" relates to a conductivity markedly higher than that of the surrounding semiconductor material, and preferably constituting, or akin to, metallic conductance.

The inhomogeneous structure of the semiconductor crystal may be formed by providing the semiconductor body with statistically distributed inclusions of a second phase. The second phase comprises an electrically good conducting phase. The second phase is constituted by geometrically anisotropic inclusions. The inclusions are dispersed throughout the semiconductor body and extend substantially parallel to the direction of incidence of the electromagnetic radiation. The inclusions preferably have the shape of elongated needles or scales. Semiconductor crystals with such inclusions, as well as method of their manufacture, are described in the United States Patent No. 3,226,225 of H. Weiss et al., issued Dec. 28, 1965, and assigned to the assignee of the present invention.

Another way of producing the necessary heterogeneous structure of the semiconductor crystalline body is to provide conducting strip-shaped areas on those surfaces of the body that extend perpendicularly to the direction of the magnetic field, the strip areas being oriented in a direction perpendicular to that of the electric current generated by the PEM-effect. The strip areas may consist of silver, copper or indium, for example.

A suitable heterogeneous structure of the semiconductor crystalline body is also obtainable by producing within the crystal alternately different concentrations of impurity atoms, such as alternating regions doped more and less respectively with donors or acceptors. These doped regions preferably extend over areas perpendicular to the direction of the current produced by the PEM-effect. Periodic fluctuations of the dopant concentration suitable for such purposes are often inadvertently encountered when crystals are produced by pulling them out of a melt contained in a crucible. They can also be produced under controlled conditions by periodically increasing and reducing the dopant concentration applied to a crystalline body or ingot during zone melting.

Figure 2:
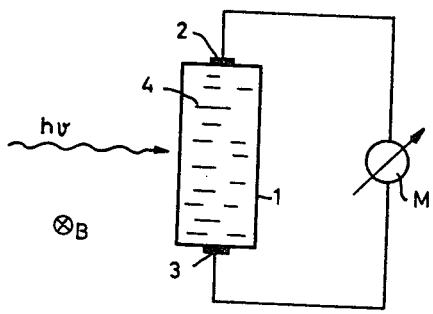
Figure 3:
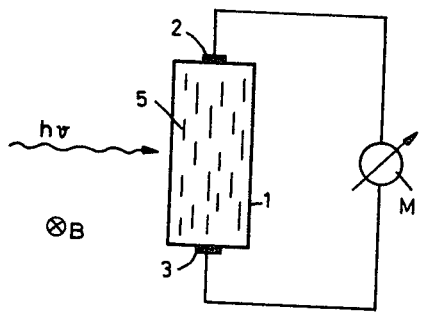
Figure 4:
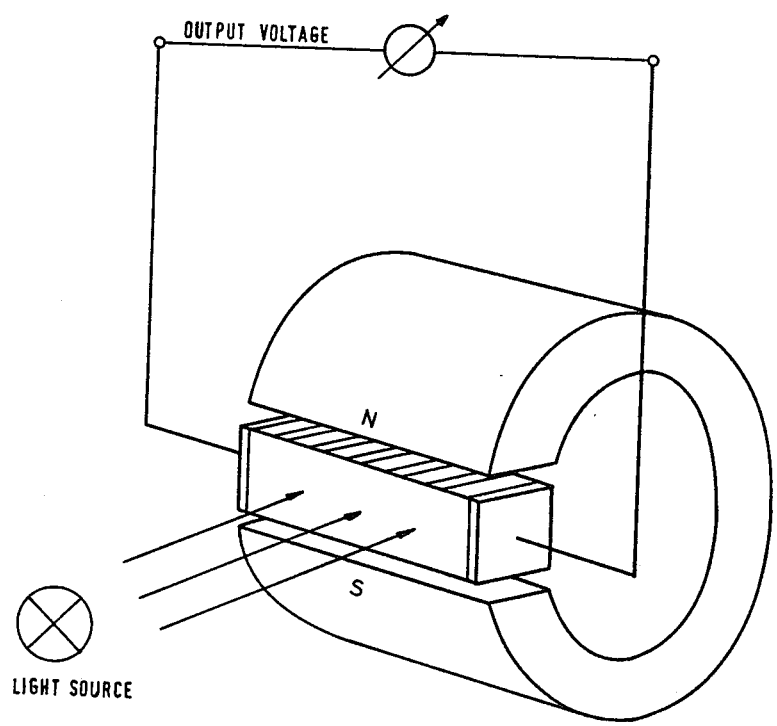

The invention will be further described with reference to the accompanying drawings in which:

FIGS. 1, 2 and 3 are explanatory and schematic, showing electromagnetic radiation sensors relative to incident radiation; and FIG. 4 shows schematically in perspective a sensor device according to the invention by way of example.

Denoted in FIGS. 1, 2 and 3 by B is the direction of the magnetic field perpendicular to the plane of illustration. An elongated semiconductor crystal 1 of prismatic shape has its opposite axial ends provided with respective electrodes 2 and 3 between which a measuring instrument M is connected. Schematically indicated at $h\nu$ is a light quantum impinging upon the crystal. The instrument M measures the voltage resulting from the PEM-effect.

According to FIG. 1, a homogeneous crystal 1, for example of indium antimonide, is located in a magnetic field B perpendicular to the plane of illustration. Light quantums $h\nu$ impinge upon the sensing face of the crystal. If the width of the forbidden zone of the crystalline material corresponds to the frequency of the incident light, the light quantums are absorbed in the crystal surface where they release electron-hole pairs. Due to accumulation of these charge carriers at the surface of incidence, there occurs a concentration gradient toward the right so that electrons (−) and holes (+) diffuse in the direction of this gradient. The magnetic field has the effect of separating the charge carriers, this being schematically indicated in FIG. 1. As a result, the electrodes 2 and 3 assume respectively different polarities, and a voltage is measured by the instrument M. Within a certain frequency range of the incident radiation depending upon the particular semiconductor material, the measured voltage is proportional to the radiation intensity. When the two electrodes 2 and 3 are connected by a low-ohmic ammeter, a short-circuit current can be measured.

Heretofore the PEM-effect has been observed only with homogeneous crystals. In contrast thereto, the semiconductor body in a radiation detector according to the invention possesses the above-mentioned heterogeneous structure. As mentioned, spacial variations in dopant concentration within the semiconductor crystals suffice for appreciably increasing the PEM-effect. A further improvement in PEM sensitivity is observed if alternate regions of higher and lower conductivity are produced by good conductive inclusions in the semiconductor crystal or by conductive strip areas on its surface. These regions, regardless of their type, are not separated from each other by barrier or boundary layers, such as p-n junctions. In the extreme case, the better conducting regions have metallic properties. These regions may have a spherical, planar, strip-shaped or needle-shaped configuration. The highest PEM sensitivity has been observed with needle-shaped inclusions.

For example, according to FIG. 2, the semiconductor body 1 contains a multiplicity of electrically good conducting needle-shaped inclusions 4, separated from each other and extending parallel to the incidence direction of the light. The electric resistance between the electrodes 2 and 3 is larger than in the body without the needle-shaped inclusions. Together with the higher voltage at the measuring instrument, the generation of power, with proper matching, is increased in the same ratio.

According to FIG. 3, the needle-shaped inclusions 5 in the crystalline semiconductor body 1 are oriented in the direction of the current axis. Hence they form shunts between the electrodes 2 and 3. As a result, the sensitivity of this device is lower than that of FIG. 1.

Suitable as material for the crystalline semiconductor body in a radiation detector according to the invention are semiconductor substances of high electron mobility, preferably a mobility above 6000 cm.$^2$/v. sec. The semiconductor material may consist for example, of an $A^{III}B^V$ compound or of a mixed crystal from $A^{III}B^V$ compounds. The terms $A^{III}B^V$ denote respective elements from the third and fifth B-groups respectively of the periodic system. Particularly suitable semiconductor materials are indium antimonide (InSb) and indium arsenide (InAs). The oriented inclusions in InSb preferably consist of nickel antimonide (NiSb).

The two specimens I and II to which reference is made in the following tabulation of measuring results consisted of the just-mentioned InSb-NiSb material. The intrinsically conducting InSb contained 1.8% by weight of NiSb in form of needle-shaped inclusions obtained by normal freezing and subsequent zone melting of a homogeneous eutectic melt.

The measuring results according to both tabulations were obtained with radiation detectors in which the orientation of the needle-shaped inclusions corresponded to that shown in FIG. 2.

SPECIMEN I

| B [kG] | $U_L$ [µv.] | $U_o$ [µv.] | $\Delta U \equiv |U_L - U_o|$ [µv.] |
|---|---|---|---|
| 0 | 9 | 1.1 | 8 |
| 5 | 29.2 | 0 | ≈25 |
| −5 | −21.4 | 0 | |
| 10 | 47.2 | 2.2 | ≈42 |
| −10 | −40.5 | −2.2 | |

SPECIMEN II

| B [kG] | $U_L$ [µv.] | $U_o$ [µv.] | $\Delta U \equiv |U_L - U_o|$ [µv.] |
|---|---|---|---|
| 0 | 0 | 0 | 0 |
| 5 | 9 | −22.5 | ≈27.5 |
| −5 | −33.8 | −11.3 | |
| 10 | 29.2 | −4.5 | ≈37 |
| −10 | −49.5 | −9.0 | |

Indicated in the first column of the tables is the magnetic field B in kG which acts upon the semiconductor body in the direction perpendicular to the plane of illustration according to FIG. 2. The (+) and (−) signs indicate the field polarities. For example B=+5 kG indicates that the magnetic field with respect to FIG. 2 is directed perpendicularly toward the observer, whereas B=−5 kG indicates that the magnetic field is directed perpendicularly toward and through the plane of illustration. The second column of each table indicates the particular voltage $U_L$ in microvolts measured at the instrument M when the crystalline body is subjected to radiation in the magnetic field B. The third column indicates the corresponding voltage $U_o$ at the measuring instrument without applying radiation to the crystalline body. The last column of the tabulation indicates the averaged amount $\Delta U$ of the difference $\Delta U = |U_L - U_o|$ [µv.]

Corresponding tests were made with an InSb body containing NiSb-needles in an orientation corresponding to FIG. 3. Within the limits of measuring accuracy, no comparable effect was observed. Up to magnetic fields of 10 kG, obtainable with ordinary permanent magnets, no defined voltage differences $\Delta U$ could be measured.

With a homogeneous InSb crystal corresponding to FIG. 1. A radiation sensor comprising magnetic field means for producing a magnetic field, a semiconductor crystalline that the sensitivity of the radiation detectors operating on the PEM-effect according to the invention is increased about 8 times.

The frequency range in which the radiation detector according to the invention absorbs the radiation and permits measuring its intensity can be varied in wide limits depending upon the selection and composition of the elements of compounds that constitute the irradiated semiconductor crystal. The radiation detector of InSb is preferably suitable for response to light radiation in the infrared and adjacent visible portion of the spectrum up to about a wave length of 8µ.

The invention is also applicable with other semiconducting base materials as well as with conductive inclusions of other substances such as MnSb. Relative to such other materials and suitable production methods, reference may be had to the aforementioned United States Patent No. 3,226,225 and the copending application of H. Wagini and H. Weiss for Thermomagnetic Effect Devices, filed concurrently herewith. So far, however, the most favorable results have been observed with the above-described InSb-NiSb sensors.

I claim:

1. A radiation sensor comprising magnetic field means for producing a magnetic field, a semiconductor crystalline body having a photo-electromagnetic effect mounted in said magnetic field and having mutually spaced electrodes for providing radiation-responsive voltage between each other and having between said electrodes a radiation incidence face accessible to radiation to be sensed, said semiconductor body comprising a multitude of inhomogeneities which form spacially alternating regions of higher and lower conductivity in substantially parallel relation to one another and transverse to the spacing direction of said electrodes and to the direction of current flow produced by the photoelectromagnetic effect in said semiconductor body.

2. A radiation sensor comprising magnetic field means for producing a magnetic field, a semiconductor crystalline body having a photo-electromagnetic effect mounted in said magnetic field and having mutually spaced electrodes for providing radiation-responsive voltage between each other and having between said electrodes a radiation incidence face accessible to radiation to be sensed, said semiconductor body having a multiplicity of mutually spaced elements whose electric conductivity is higher than that of the semiconductor material between said elements so as to form substantially parallel regions of alternately higher and lower electric conductivity, said regions extending substantially parallel to the direction of incident radiation and substantially at a right angle to the direction of current flow between said electrodes produced by the photo-electromagnetic effect in said semiconductor body.

3. A radiation sensor comprising magnetic field means for producing a magnetic field, a semiconductor crystalline body having a photo-electromagnetic effect mounted in said magnetic field and having mutually spaced electrodes for providing radiation-responsive voltage between each other, said semiconductor body having between said electrodes a radiation incidence face accessible to radiation to be sensed and having a multitude of geometrically anisotropic inclusions dispersed and embedded in the semiconductor body and of higher conductivity than the semiconductor substance of the semiconductor body, said inclusions being substantially oriented transversely to the spacing direction of said electrodes and to the direction of current flow produced by the photo-electromagnetic effect in said semiconductor body and substantially parallel to the direction of radiation incidence at said face.

4. In a radiation sensor according to claim 2, said mutually spaced elements being formed by parallel and mutually spaced strip areas on a body surface extending transversely of said radiation incidence face.

5. In a radiation sensor according to claim 2, said semiconductor body having substantially the shape of a rectangular prism, said electrodes being located on axially opposite ends respectively of the prism, one of the lateral faces forming said radiation incidence face, said magnetic field means having two pole faces opposite each other and facing the two prism lateral faces adjacent to said incidence face, and said mutually spaced elements being formed by parallel and mutually spaced strip areas on said latter two faces of said prism so as to extend at right angles to said incidence face.

6. In a radiation sensor according to claim 2, said body being formed of $A^{III}B^{V}$ semiconductor compound material having a carrier mobility above 6000 cm.²/volt second, and said inhomogeneities consisting of geometrically anisotropic segregations dispersed and oriented in said material.

7. In a radiation sensor according to claim 2, said semiconductor body being formed of indium antimonide, and said inhomogeneities consisting of needle-shaped segregations of nickel antimonide dispersed and embedded in the indium antimonide, said nickel antimonide constituting about 1.8% by weight of the indium antimonide.

8. A radiation sensor comprising magnetic field means for producing a magnetic field a semiconductor crystal line body having a photo-electromagnetic effect mounted in said magnetic field and having mutually spaced electrodes for providing radiation-responsive voltage between each other, said semiconductor body having between said electrodes a radiation incidence face accessible to radiation to be sensed and having a multitude of geometrically anisotropic inclusions dispersed and embedded in the semiconductor body and of higher conductivity than the semiconductor substance of the semiconductor body, said inclusions having the shape of elongated needles whose thickness is smaller than the wave length of the radiation to be sensed and being substantially oriented transversely to the spacing direction of said electrodes and to the direction of current flow produced by the photo-electromagnetic effect in said semiconductor body and substantially parallel to the direction of radiation incidence at said face.

References Cited

UNITED STATES PATENTS 3,226,225  12/1965  Weiss et al. _____ 136—89

OTHER REFERENCES

Kurnick et al., "Photoconductivity and Photoelectromagnetic Effects in InSb"; Journal of Applied Physics; vol. 27, No. 3; March 1956; pages 278 and 283 relied on.

Bube, Photoconductivity of Solids; Wiles, N.Y.; Copy received by Scientific Library January 1962; QC 612 P5 B8 c.3. Pages 284 and 285 relied on.

RALPH G. NILSON, *Primary Examiner.*

T. N. GRIGSBY, *Assistant Examiner.*